US008831182B2

(12) United States Patent
Nelson (10) Patent No.: US 8,831,182 B2
(45) Date of Patent: Sep. 9, 2014

(54) SYSTEM AND METHOD FOR DETERMINING A RESPONSIBLE SERVICE AREA FOR A SERVICE REQUEST CALL (75) Inventor: Michael Jay Nelson, Longmont, CO (US)

(73) Assignee: West Corporation, Omaha, NE (US)

( * ) Notice: Subject to any disclaimer, the term of this patent is extended or adjusted under 35 U.S.C. 154(b) by 233 days.

(21) Appl. No.: 13/473,148

(22) Filed: May 16, 2012

(65) Prior Publication Data
US 2013/0308762 A1    Nov. 21, 2013

(51) Int. Cl.
*H04M 11/04*    (2006.01)

(52) U.S. Cl.
USPC ............................................. 379/45; 455/466

(58) Field of Classification Search
None
See application file for complete search history.

(56) References Cited

U.S. PATENT DOCUMENTS

| | | | |
|---|---|---|---|
| 8,014,341 B1* | 9/2011 | Ray | 370/328 |
| 8,060,389 B2* | 11/2011 | Johnson | 705/6 |
| 2005/0190892 A1* | 9/2005 | Dawson et al. | 379/37 |
| 2007/0238448 A1* | 10/2007 | Gallagher et al. | 455/414.2 |
| 2009/0275350 A1* | 11/2009 | Poremba | 455/466 |
| 2010/0128935 A1* | 5/2010 | Filley et al. | 382/113 |
| 2010/0131196 A1* | 5/2010 | Searight et al. | 701/208 |
| 2010/0185556 A1* | 7/2010 | Kumar et al. | 705/36 R |
| 2010/0281020 A1* | 11/2010 | Drubner | 707/722 |
| 2012/0051603 A1* | 3/2012 | Maltby, II | 382/113 |
| 2012/0239670 A1* | 9/2012 | Horn et al. | 707/756 |
| 2013/0090086 A1* | 4/2013 | Lopez Lopez | 455/410 |
| 2013/0275863 A1* | 10/2013 | Rogers et al. | 715/239 |

* cited by examiner

*Primary Examiner* — Maria El-Zoobi (57) ABSTRACT

A method for determining a responsible service area for a service request call, the service request call including a civic address indicating locus of origin of the service request call, includes: (a) accessing a geographic information system database relating to the locus of origin to identify a street line segment containing the civic address; (b) determining whether the street line segment is wholly contained within any polygon; (c) when the street line segment is wholly contained within a respective polygon, presenting the respective polygon as the responsible service area; and (d) when the street line segment is not wholly contained within the respective polygon, (1) recording a data deficiency identifying the non-containment as a polygon-segment error, (2) determining an estimated locus of the civic address on the street line segment in a resulting polygon containing the estimated locus, and (3) presenting the resulting polygon as the responsible service area.

26 Claims, 4 Drawing Sheets

SYSTEM AND METHOD FOR DETERMINING A RESPONSIBLE SERVICE AREA FOR A SERVICE REQUEST CALL

FIELD OF THE INVENTION

The present invention is directed to telecommunication systems, and especially to effecting correct routing of service request calls, such as by way of example and not by way of limitation, emergency service request calls.

BACKGROUND OF THE INVENTION

Entities responsible for responding to service request calls may be designated as responsible for service request calls originating from loci within a designated area. Responsible areas may be designated in a geographic system as polygons. Service request calls may be accompanied by information relating to the locus of origin of the call to aid in routing the call to the entity responsible for responding to the service request presented by the service request call.

A geographic system, such as by way of example and not by way of limitation a geographic information system (GIS), may include address information, street line segments and serving area polygons, and may rise a specific set of polygons to determine a specific service responsibility. Different polygon layers, or sets of polygons, may be used to differentiate between multiple types of service. Preferably the polygons for a specific geographic area and a specific service layer should not overlap and should not have areas that are not covered by a specific serving area polygon. That is, preferably there are no duplications of service area responsibility and no gaps in service area responsibility. In this description the term serving area polygon is intended to refer to a specific polygon within one set of serving area polygons. A location, such as a locus of origin of a service request call, may be used with multiple layers or polygon sets to determine different types of service responsibilities for the same location. For example, one set of polygons or polygon layers may be used to determine call routing to a Public Safety Answering Point (PSAP; sometimes referred to as a Public Safety Answering Position), another set of polygons or polygon layers may be used to determine call routing to police responsibility entity, another set of polygons or polygon layers may be used to determine call routing to a medical emergency response entity, and another set of polygons or polygon layers may be used to determine call routing for fire emergency response entity.

Some applications require determining service area based on a civic address. For example, determining responsibility by defining service areas and mapping a given location as residing within a given service area is a feature of NG9-1-1 (Next Generation 9-1-1) call processing when a caller's location is represented as a civic address. Managing and improving the data quality of the GIS database used for NG9-1-1 call processing is desirable to create a high quality and reliable NG9-1-1 call routing solution.

A civic address can be used to determine call routing and emergency responder (police, fire, medical, poison) responsibility by finding that a corresponding street line segment completely resides within a given jurisdictional polygon. If the corresponding street line segment does not completely reside within a given jurisdictional polygon, creating a change tracking ticket to eventually update the geographic information system database information will result in better call routing algorithms over time.

For purposes of illustration, by way of example and not by way of limitation, the present invention will be described in the context of an emergency service network in the United States, commonly referred to as a 9-1-1 network. The teachings of the present invention are equally applicable, useful and novel in other special number calling systems, such as maintenance service networks, college campus security networks, abbreviated number networks for calling commercial services and other networks.

By way of further example and not by way of limitation, a user may engage in a 9-1-1 call seeking emergency services in an excited or bewildered frame of mind. Such a rattled user may benefit from guidance provided by the emergency service call answering position, such as a Public Safety Answering Point (PSAP; sometimes referred to as a Public Safety Answering Position). It may be especially important to ascertain the locus of origin of the service request call in order that a proper responsible agency may be identified for rendering the requested service. In a situation involving an emergency service request it may be important that a local emergency responder—such as fire, police or emergency services—be automatically designated to receive an emergency service request call. Such automatic designation may be carried out when location information is provided accompanying the service request call and may be employed to effect routing the call to a responsible party in a service area responsible for serving the locus indicated by the location information accompanying the call.

Location information that may accompany a service request call such as an emergency request call may be in the form of civic address information indicating the locus of origin of the call. For purposes of this description, the term "civic address" may include, by way of example and not by way of limitation, any textual based address format. Such textual based format may be referred to as street address, civic address, postal address, jurisdictional address or MSAG (Master Street Address Guide) addresses. This description uses the term "civic" to refer to all the above examples where the address is defined in a textual form that includes, but is not limited to, country, state, city, street name and house number.

A geographic database may include address information, street line segments and serving area polygons. As with any database, there may be errors contained in a geographical database relied upon for identifying service responsibilities.

It would be useful to have a method and system for automatic identification of presence of errors in database information as early as may be possible, and to record the identified errors for later treatment and correction.

It would be useful to have a method and system for identifying a data deficiency or other error during the process of determining service responsibility and to record the identified errors for later treatment and correction.

SUMMARY THE INVENTION

A method for determining a responsible service area for a service request call, the service request call including a civic address indicating locus of origin of the service request call, includes: (a) accessing a geographic information system database relating to the locus of origin to identify a street line segment containing the civic address; (b) determining whether the street line segment is wholly contained within an polygon; (c) when the street line segment is wholly contained within a respective polygon, presenting the respective polygon as the responsible service area; and (d) when the street line segment is not wholly contained within the respective polygon, (1) recording a data deficiency identifying the non-containment as a polygon-segment error; that is a data error either with the service area polygon or the street line segment, (2) determining an estimated locus of the civic address on the street line segment in a resulting polygon containing the estimated locus, and (3) presenting the resulting polygon as the responsible service area.

A system for treating data errors while determining serving area responsibility for a service request call includes: (a) a service center configured for receiving the service request call; the service request call including a civic address indicating locus of origin of the service request call; and (b) a data processing apparatus coupled with the service center for accessing a geographic information system (GIS) database relating to the civic address; the data processing apparatus being operated so that: (1) when the GIS database includes a street line segment containing the civic address, whether the street line segment is wholly contained within a serving area polygon of a polygon set relating to the serving area is determined; (2) when the street line segment is not wholly contained within the serving area polygon, [a] a data deficiency is recorded via a change tracking record for later use in correcting data; [b] the civic address is geocoded to approximate geographic location of the civic address; and [c] an including serving area polygon containing the approximate geographic location is determined; and (3) when the street line segment is wholly contained within the serving area polygon, the serving area responsibility is returned.

It is, therefore, a feature of the present invention to provide a method and system for automatic identification of presence of errors in database information as early as may be possible, and recording of the identified errors for later treatment and correction.

It is another feature of the present invention to provide a method and system for identifying a data deficiency or other error during the process of determining service responsibility and recording the identified errors for later treatment and correction.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as a 9-1-1 network. The teachings of the present invention are equally applicable, useful and novel in other special number calling systems, such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

When utilized within a geographical information system (GIS) the street of a civic address may be represented as a line segment with distinct address attributes and end points. The street line segment endpoints are each assigned a number (e.g., a house number) that determines the street address range of the street line segment. A house number that falls between two numbers of a street line segment may be assigned a point on the street line segment by a process of interpolating the position of the address, within the house number range along the street line segment. However, this process does not necessarily yield an accurate point on the street line segment relative to a real world position of a house address on a street.

The appropriate service provider for a given area can be determined by using a civic address and determining which serving area the elements that represent the physical location of the civic address reside within. Preferably, the street line segment should completely reside within one serving area polygon.

Figure 1:
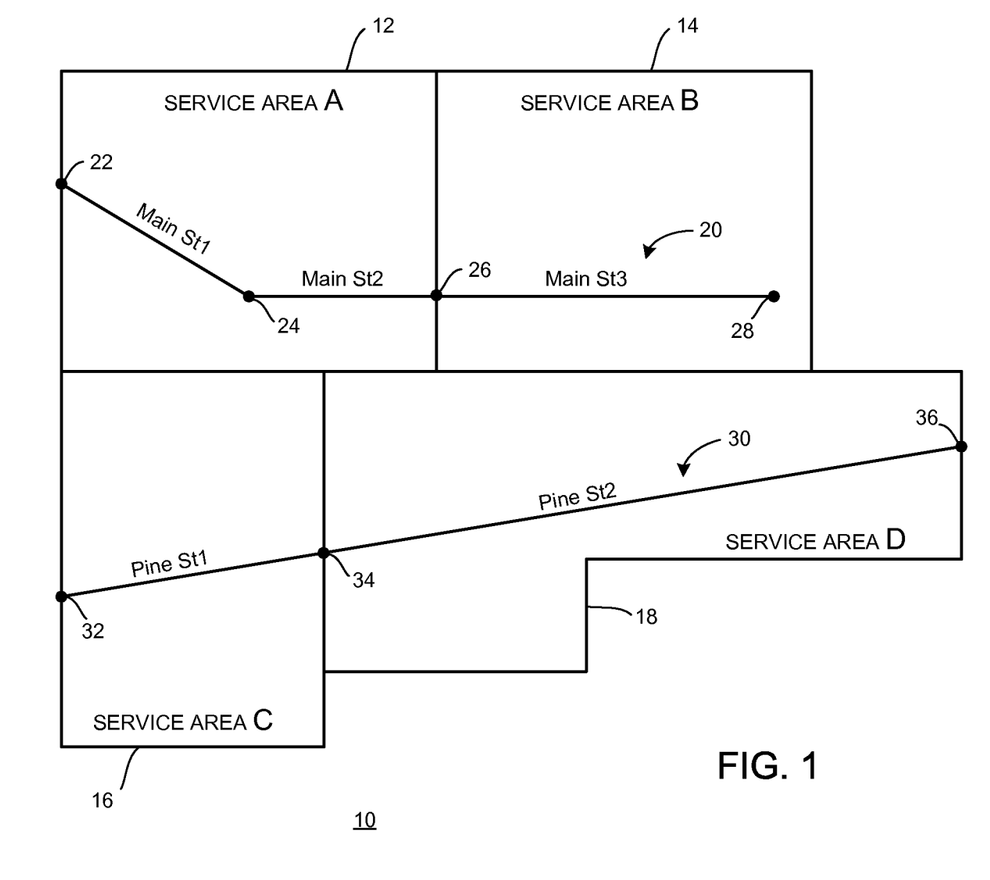
FIG. 1 is a schematic illustration of a geographic information system including polygonal service area boundaries containing street line segments in which all street line segments are wholly contained within a respective polygon.

FIG. 1 is a schematic illustration of a geographic information system including polygonal service area boundaries containing street line segments in which all street line segments are wholly contained within a respective polygon. In FIG. 1, a geographic area 10 represented by a geographic information system (GIS) includes polygons representing respective service areas. Thus, a polygon 12 represents a Service Area A. A polygon 14 represents a Service Area B. A polygon 16 represents a Service Area C. A polygon 18 represents a Service Area D.

A street 20 is indicated as "Main St". Main St is represented as comprising segments: Main St1 extends from an end point 22 to an end point 24; Main St2 extends from end point 24 to an end point 26; Main St3 extends from end point 26 to an end point 28. Each respective Main St segment is wholly contained within a respective polygon. Thus, Main St1 is wholly contained within polygon 12. Main St2 is also wholly contained within polygon 12. Main St3 is wholly contained within polygon 14.

A street 30 is indicated as "Pine St". Pine St is represented as comprising segments: Pine St1 extends from an end point 32 to an end point 34; Pine St2 extends from end point 34 to an end point 36. Each respective Pine St segment is wholly contained within a respective polygon. Thus, Pine St1 is wholly contained within polygon 16. Pine St2 is also wholly contained within polygon 18.

By way of illustration and not by way of imitation, presume that Main St1 has a House Address Range 100-199, Main St2 has a House Address Range 200-299, Main St3 has a House Address Range 300-499 and Pine St has a House Address Range 100-599.

Main Street 20 does not have a line segment that crosses a boundary between Service Area A and Service Area B as line segments Main St2 and Main St3 have an end point 26 at the service area boundary. A request for service that occurs along Main Street with a civic address within a range of interest (e.g., a house number between 100-499) will fall on a street line segment that is fully contained within one and only one of Service Area A and Service Area B. Thus there is a definitively determined service area as the proper service area for a locus of origin for a service call at a house number on Main Street between 100-499. A request for service that occurs on a civic address along Main Street can be well determined because every street line segment is fully contained within a service area boundary.

Figure 2:
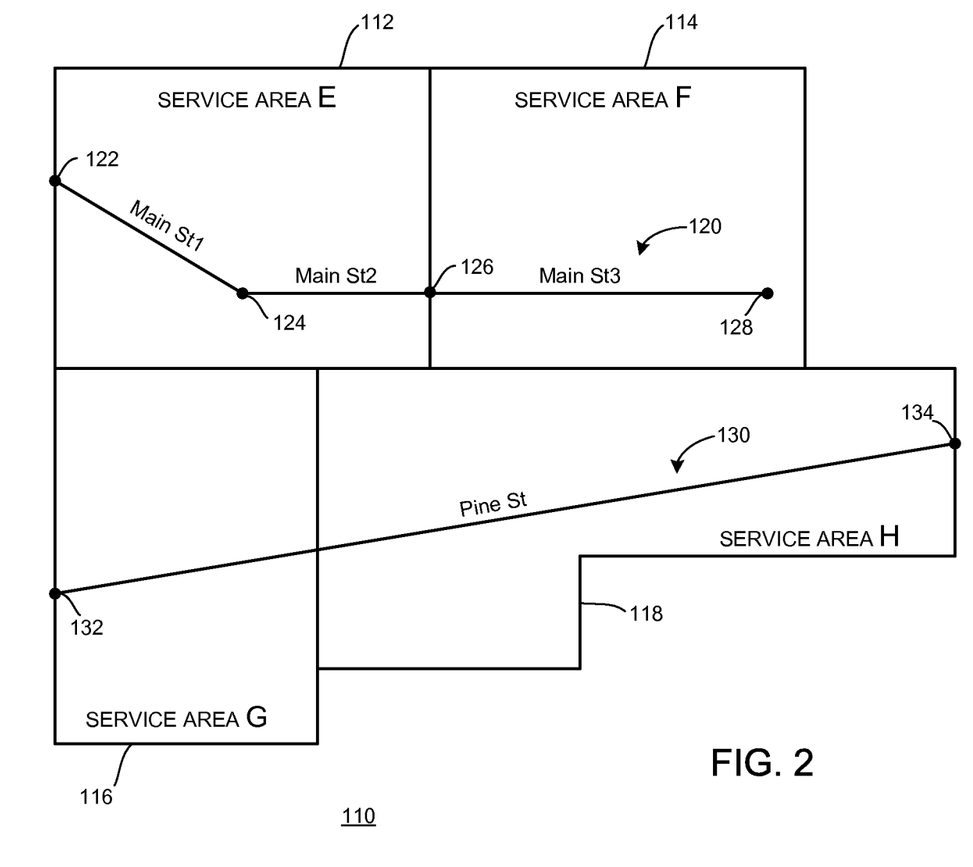
FIG. 2 is a schematic illustration of a geographic information system including polygonal service area boundaries containing street line segments in which not all street line segments are wholly contained within a respective polygon.

FIG. 2 is a schematic illustration of a geographic information system including polygonal service area boundaries containing street line segments in which not all street line segments are wholly contained within a respective polygon. Sin FIG. 2, a geographic area 110 represented by a geographic information system (GIS) includes polygons representing respective service areas. Thus, a polygon 112 represents a Service Area E. A polygon 114 represents a Service Area F. A polygon 116 represents a Service Area G. A polygon 118 represents a Service Area H.

A street 120 is indicated as "Main St". Main St is represented as comprising, segments: Main St11 extends from an end point 122 to an end point 124; Main St12 extends from end point 124 to an end point 126; Main St13 extends from end point 126 to an end point 128. Each respective Main St segment is wholly contained within a respective polygon. Thus, Main St11 is wholly contained within polygon 112. Main St12 is also wholly contained within polygon 112. Main St13 is wholly contained within polygon 114.

A street 130 is indicated as "Pine St". Pine St is represented as extending from an end point 132 to an end point 134. Thus, Pine St spans two polygons 116, 118. Consequently, Pine St is not wholly contained within either polygon 116 or polygon 118. This may be regarded as an error condition in the context of a geographic information system.

In an arrangement as illustrated by FIG. 2, a request for service that occurs from a civic address on Pine St cannot match a street line segment that is fully contained within one service area so that a proper service area cannot be definitely defined. In such a situation, the civic address house number must first be interpolated to a point on Pine St street line segment 130 and then the interpolated point must be found to occur in either Service Area G or Service Area H. As the derived request for service point (i.e., the interpolated point) on Pine St approaches the point at which Pine St street line segment 130 intersects a boundary between Service Area G and Service Area H an error is more likely to occur that may result in choosing a wrong service area. In such a case a data deficiency or polygon-segment error may be noted. For purposes of this disclosure, the term "polygon-segment error" may refer to a data error either with the service area polygon or the street line segment. A change tracking ticket or similar recordation of the error should be created to adjust the data. It is preferable that such a recordation of error be created during the process of determining service area responsibility and changes to databases or other changes to correct the noted error be carried out later. One possible solution may to break Pine Street into two street line segments separated by an end point situated at the border between Service Area G and Service Area H to present Pine St1 and Pine St2 substantially as illustrated in FIG. 1.

As described above, an appropriate responsible service provider for a given area can be determined by using a civic address and determining within which serving area the elements that represent the physical location of the civic address reside.

An example is 9-1-1 call processing when the calling party location information is provided in a civic address form and the call is to be delivered to a Public Safety Answering Point (PSAP) determined by geographic area polygons that overlay a street address layer. The street address layer may be represented by elements including street line segments with attributes of a house number range attached to endpoints that define the beginning and end of the street segment. For best data quality purposes the street segment must be completely contained within a PSAP serving area polygon. If the street segment is not completely contained within a PSAP serving area polygon an error can occur when determining the proper PSAP to receive the emergency call based on inaccuracy of locating the caller's house number on the geographic line segment representing the street line segment. A data discrepancy or polygon-segment error may be noted and a change tracking record or similar record of the noted error may be created during 9-1-1 call processing when the street line segment is not completely contained within a PSAP serving area polygon. Such a change tracking record may be used to ensure that the data is later corrected to remove the possible error condition by either adjusting the polygon to completely contain the street line segment or to change the street line segment such that it completely resides within a unique PSAP serving polygon.

Use of the present invention may result in continuous data improvement of service area boundaries represented as polygons overlaying a street address layer of street center lines with address ranges.

Alternatively, determination of responsible service area given a civic address may be employed with geospatial coordinates (e.g., latitude and longitude). This alternate method determines a responsible service area and determines routing of a call based on a civic address by geocoding the address information and mapping the address information to the data item that defines the geographic representation of the street and address. The method ensures that the street segment is wholly contained within a jurisdictional polygon. If the street segment is not wholly contained within a jurisdictional polygon an error condition is noted and recorded in a discrepancy report that may be created to record, track, and eventually resolve noted errors. If the street line segment of interest does not fully reside within one serving area polygon the alternate method may specify that the house number be interpolated to an approximate point on the street line segment and service area determination based on the resulting geographic coordinates of the approximate point.

This alternate method does not require geocoding to determine the serving area polygon. This alternate method may be employed when a street line segment does not fall completely within a serving area polygon to use a geocoding process to determine an approximate point on a particular street line segment. The approximate point may be used to determine a responsible serving area polygon and a change tracking record may be created to note the data deficiency for later correction.

Figure 3:
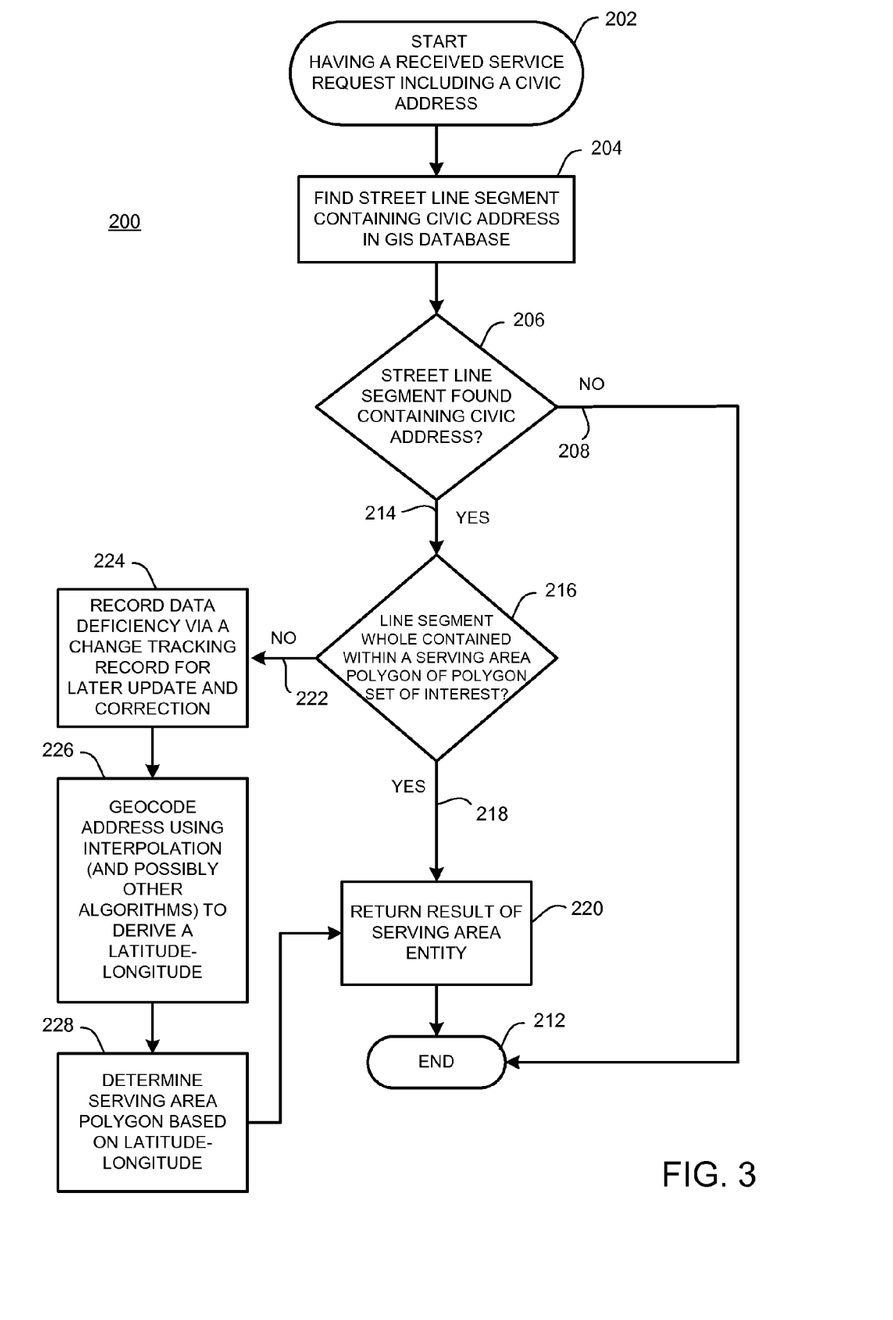
FIG. 3 is a flow diagram illustrating the method of the present invention.

FIG. 3 is a flow diagram illustrating the method of the present invention. In FIG. 3, a method 200 for treating data errors while determining serving area responsibility for a service request call begins having received the service request call, as indicated by a START locus 202. The service request call includes a civic address indicating locus of origin of the service request call.

Method 200 continues with accessing a geographic information system database relating to the civic address to find a street line segment containing the civic address, as indicated by a block 204.

Method 200 continues with posing a query whether a street line segment containing the civic address is contained in the geographic information system database, as indicated by a query block 206.

When the geographic information system database does not include a street line segment containing the civic address, method 200 proceeds from query block 206 via a NO response line 208 to terminate as indicated by an END locus 212.

When the geographic information system database does include a street line segment containing the civic address, method 200 proceeds from query block 206 via a YES response line 214 to pose a query whether the street line segment containing the civic address is wholly contained within a serving area polygon of a polygon set relating to the serving area, as indicated by a query block 216.

When the street line segment containing the civic address is not wholly contained within a serving area polygon of a polygon set relating to the serving area, method 200 proceeds from query block 216 via a NO response line 222 and records a data deficiency via a change tracking record for later use in correcting data, as indicated by a block 224.

Method 200 proceeds from block 224 to geocode the civic address to approximate geographic location of the civic address, as indicated by a block 226.

Method 200 proceeds from block 226 to determine an including serving area polygon containing the approximate geographic location as the serving area responsibility, as indicated by a block 228.

Method 200 proceeds from block 228 to return the serving area responsibility, as indicated by a block 220. Method 200 thereafter proceeds from block 220 to terminate as indicated by an END locus 212.

When the street line segment containing the civic address is wholly contained within a serving area polygon of a polygon set relating to the serving area, method 200 proceeds from query block 216 via a YES response line 218 to return the serving area responsibility, as indicated by a block 220. Method 200 thereafter proceeds from block 220 to terminate as indicated by an END locus 212.

Figure 4:
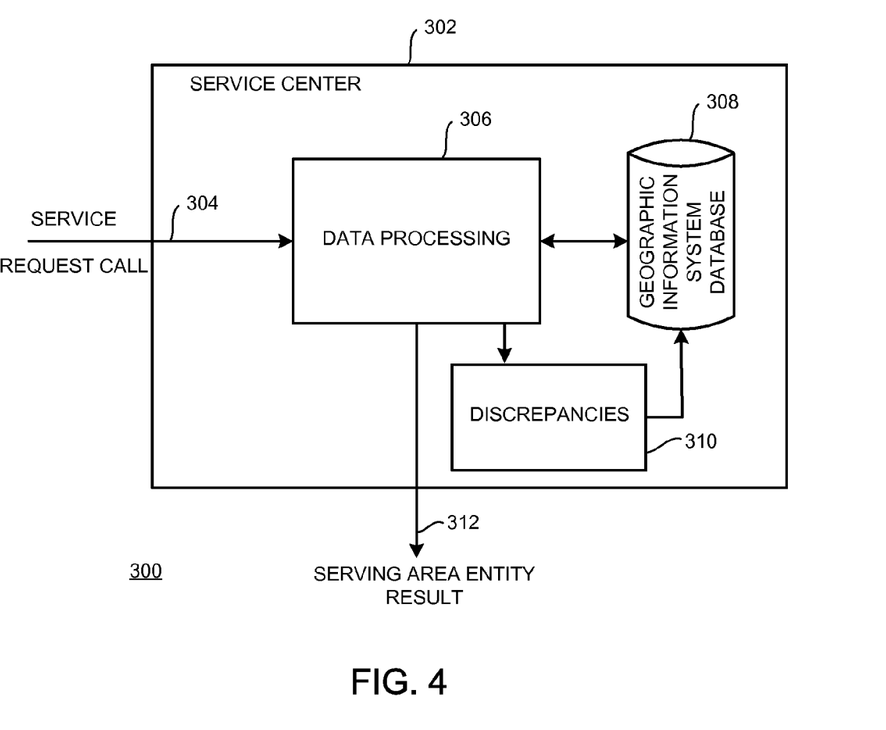
FIG. 4 is a schematic diagram of the system of the present invention.

FIG. 4 is a schematic diagram of the system of the present invention. In FIG. 4, A system 300 for treating, data errors while determining serving area responsibility for a service request call includes a service center 302 configured for receiving the service request call at a call receiving locus 304. The service request call includes a civic address indicating locus of origin of the service request call (not shown in FIG. 4).

A data processing apparatus 306 is coupled with service center 302 for accessing a geographic information system database 308 relating to the civic address. Data processing apparatus 306 is being operated so that (1) when geographic information system database 308 includes a street line segment containing the civic address (see FIGS. 1-2), whether the street line segment is wholly contained within a serving area polygon of a polygon set relating to the serving area is determined; (2) when the street line segment is not wholly contained within the serving area polygon, [a] a data deficiency is recorded via a change tracking record stored in a discrepancy data store 310 for later use in correcting data in the geographic information system database 308.

Data processing apparatus 306 is further operated to geocode the civic address to approximate geographic location of the civic address and determine an including serving area polygon containing the approximate geographic location. When data processing apparatus 306 determines that the street line segment is wholly contained within the serving area polygon, the serving area responsibility is returned, as indicated at an output locus 312.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims.

The invention claimed is:

1. A method for treating data errors while determining serving area responsibility for a service request call; the method comprising:
   (a) receiving said service request call; said service request call including a civic address indicating locus of origin of said service request call;
   (b) accessing a geographic information system database relating to said civic address;
      (1) when said geographic information system database does not include a street line segment containing said civic address,
         [a] proceeding to step (d);
      (2) when said geographic information system database includes a street line segment containing said civic address,
         [a] determining whether said street line segment is wholly contained within a serving area polygon of a polygon set relating to said serving area;
      (3) when said street line segment is not wholly contained within said serving area polygon,
         [a] recording a data deficiency via a change tracking record for later use in correcting data;
         [b] geocoding said civic address to approximate geographic location of said civic address;
         [c] determining an including serving area polygon containing said approximate geographic location as said serving area responsibility; and
         [d] proceeding to step (c);
      (4) when said street line segment is wholly contained within said serving area polygon,
         [a] determining said serving area polygon as said serving area responsibility; and
         [b] proceeding to step (c);
   (c) returning said serving area responsibility; and
   (d) terminating the method.

2. The method for treating data errors while determining serving area responsibility for a service request call as recited in claim 1 wherein said service request call is an emergency service request call.

3. The method for treating data errors while determining serving area responsibility for a service request call as recited in claim 1 wherein said serving area polygon relates to a public safety answering point serving said locus of origin.

4. The method for treating data errors while determining serving area responsibility for a service request call as recited in claim 1 wherein said civic address is based on a master street address guide.

5. The method for treating data errors while determining serving area responsibility for a service request call as recited in claim 2 wherein said serving area polygon relates to a public safety answering point serving said locus of origin.

6. The method for treating data errors while determining serving area responsibility for a service request call as recited in claim 2 wherein said civic address is based on a master street address guide.

7. The method for treating data errors while determining serving area responsibility for a service request call as recited in claim 6 wherein said civic address is based on a master street address guide.

8. A system for treating data errors while determining serving area responsibility for a service request call; the system comprising:
   (a) a service center configured for receiving said service request call; said service request call including a civic address indicating locus of origin of said service request call; and
   (b) a data processing apparatus coupled with said service center for accessing a geographic information system database relating to said civic address; said data processing apparatus being operated so that:
      (1) when said geographic information system database includes a street line segment containing said civic address, whether said street line segment is wholly contained within a serving area polygon of a polygon set relating to said serving area is determined;
      (2) when said street line segment is not wholly contained within said serving area polygon,
         [a] a data deficiency is recorded via a change tracking record for later use in correcting data;
         [b] said civic address is geocoded to approximate geographic location of said civic address; and
         [c] an including serving area polygon containing said approximate geographic location is determined; and
      (3) when said street line segment is wholly contained within said serving area polygon, said serving area responsibility is returned.

9. The system for treating data errors while determining serving area responsibility for a service request call as recited in claim 8 wherein said service request call is an emergency service request call.

10. The system for treating data errors while determining serving area responsibility for a service request call as recited in claim 8 wherein said serving area polygon relates to a public safety answering point serving said locus of origin.

11. The system for treating data errors while determining serving area responsibility for a service request call as recited in claim 8 wherein said civic address is based on a master street address guide.

12. The system for treating data errors while determining serving area responsibility for a service request call as recited in claim 9 wherein said serving area polygon relates to a public safety answering point serving said locus of origin.

13. The system for treating data errors while determining serving area responsibility for a service request call as recited in claim 9 wherein said civic address is based on a master street address guide.

14. The system for treating data errors while determining serving area responsibility for a service request call as recited in claim 13 wherein said civic address is based on a master street address guide.

15. A method for determining a responsible service area for a service request call; said service request call including a civic address indicating locus of origin of said service request call; the method comprising:
   (a) accessing a geographic information system database relating to said locus of origin to identify a street line segment containing said civic address;
   (b) determining whether said street line segment is wholly contained within any polygon;
   (c) when said street line segment is wholly contained within a respective polygon, presenting said respective polygon as said responsible service area; and
   (d) when said street line segment is not wholly contained within said respective polygon,
      (1) recording a data deficiency identifying said non-containment as a polygon-segment error,
      (2) determining an estimated locus of said civic address on said street line segment in a resulting polygon containing said estimated locus, and
      (3) presenting said resulting polygon as said responsible service area.

16. The method for determining a responsible service area for a service request call as recited in claim 15 wherein said service request call is an emergency service request call.

17. The method for determining a responsible service area for a service request call as recited in claim 15 wherein said serving area polygon relates to a public safety answering point serving said locus of origin.

18. The method for determining a responsible service area for a service request call as recited in claim 15 wherein said civic address is based on a master street address guide.

19. The method for determining a responsible service area for a service request call as recited in claim 16 wherein said serving area polygon relates to a public safety answering point serving said locus of origin.

20. The method for determining a responsible service area for a service request call as recited in claim 16 wherein said civic address is based on a master street address guide.

21. A system for determining a responsible service area for a service request call; said system configured for receiving said service request call, wherein said service request call comprises a civic address indicating locus of origin of said service request call; the system being operated so that:
   (a) when said service request call is received, accessing a geographic information system database relating to said locus of origin to identify a street line segment containing said civic address;
   (b) determining whether said street line segment is wholly contained within any polygon;
   (c) when said street line segment is wholly contained within a respective polygon, presenting said respective polygon as said responsible service area; and
   (d) when said street line segment is not wholly contained within said respective polygon,
      (1) recording a data deficiency identifying said non-containment as a polygon-segment error,
      (2) determining an estimated locus of said civic address on said street line segment in a resulting polygon containing said estimated locus, and
      (3) presenting said resulting polygon as said responsible service area.

22. The system for determining a responsible service area for a service request call as recited in claim 21 wherein said service request call is an emergency service request call.

23. The system for determining a responsible service area for a service request call as recited in claim 21 wherein said serving area polygon relates to a public safety answering point serving said locus of origin.

24. The system for determining a responsible service area for a service request call as recited in claim 21 wherein said civic address is based on a master street address guide.

25. The system for determining a responsible service area for a service request call as recited in claim 22 wherein said serving area polygon relates to a public safety answering point serving said locus of origin.

26. The system for determining a responsible service area for a service request call as recited in claim 22 wherein said civic address is based on a master street address guide.

* * * * *